US010443581B2

(12) United States Patent
Jones et al.

(10) Patent No.: US 10,443,581 B2
(45) Date of Patent: Oct. 15, 2019

(54) ENVIRONMENTAL THERMAL ENERGY CONVERSION

(71) Applicant: Seatrec, Inc.

(72) Inventors: Jack A. Jones, Arcadia, CA (US); Yi Chao, Arcadia, CA (US); David M. Fratantoni, Arcadia, CA (US); Michael Martin Zedelmair, Arcadia, CA (US); Robin Edward Willis, Arcadia, CA (US); Robert Scott Leland, Arcadia, CA (US)

(73) Assignee: Seatrec, Inc., Monrovia, CA (US)

( * ) Notice: Subject to any disclaimer, the term of this patent is extended or adjusted under 35 U.S.C. 154(b) by 0 days.

(21) Appl. No.: 15/799,384

(22) Filed: Oct. 31, 2017

(65) Prior Publication Data

US 2018/0119680 A1     May 3, 2018

Related U.S. Application Data

(60) Provisional application No. 62/479,667, filed on Mar. 31, 2017, provisional application No. 62/415,839, filed on Nov. 1, 2016.

(51) Int. Cl.
*F03G 7/05*     (2006.01)
*F03G 7/04*     (2006.01)

(52) U.S. Cl.
CPC ................ *F03G 7/05* (2013.01); *F03G 7/04* (2013.01); *Y02E 10/10* (2013.01); *Y02E 10/14* (2013.01); *Y02E 10/34* (2013.01)

(58) Field of Classification Search
CPC ... F03G 7/05; F03G 7/04; Y02E 10/10; Y02E 10/14; Y02E 10/34

(Continued)

(56) References Cited

U.S. PATENT DOCUMENTS 3,449,589 A * 6/1969 Majkrzak .................. F01D 9/02
                                                         290/2
3,987,629 A * 10/1976 Pecar ........................ F03G 7/04
                                                     60/516

(Continued)

FOREIGN PATENT DOCUMENTS

CN     104481828     4/2015
CN     204267240     4/2015

(Continued)

OTHER PUBLICATIONS

Patent Cooperation Treaty, International Search Report and Written Opinion for International application No. PCT/US 17/59485, dated Mar. 5, 2018, 8 pages.

*Primary Examiner* — Hoang M Nguyen
(74) *Attorney, Agent, or Firm* — Stetina Brunda Garred and Brucker

(57) ABSTRACT

A method of electricity production using water thermal energy includes compressing an enclosed working fluid at a first vertical position relative to a surface of a body of water to cause the fluid to move to a second vertical position relative to the surface and subsequently move to the first position in a closed loop, an external environment at the second position having a greater temperature than an external environment at the first position such that the fluid transitions between a liquid phase at the first position and a vapor phase at the second position, the compressing using power from a battery, and expanding the fluid at the second position to generate electricity to charge the battery. The first and second positions may be two depths of the body of water or a height of an atmosphere above the body of water and a depth of the body of water.

24 Claims, 7 Drawing Sheets

(58) Field of Classification Search
USPC .................. 60/641.2–641.4, 641.6–641.7
See application file for complete search history.

(56) References Cited

U.S. PATENT DOCUMENTS

| | | | |
|---|---|---|---|
| 4,186,311 A * | 1/1980 | Humiston | C02F 1/02 |
| | | | 290/1 R |
| 4,255,933 A * | 3/1981 | Bailey | F03G 7/04 |
| | | | 60/641.2 |
| 7,353,768 B1 | 4/2008 | Jones et al. | |
| 7,987,674 B2 | 8/2011 | Jones et al. | |
| 8,026,625 B2 | 9/2011 | Jones et al. | |
| 8,689,556 B2 | 4/2014 | Jones et al. | |
| 8,984,883 B2 * | 3/2015 | Riley | F03G 7/04 |
| | | | 290/1 R |
| 2006/0137349 A1 * | 6/2006 | Pflanz | F03G 7/05 |
| | | | 60/641.2 |
| 2007/0289303 A1 * | 12/2007 | Prueitt | F03G 7/05 |
| | | | 60/641.7 |
| 2009/0013691 A1 | 1/2009 | Jones et al. | |
| 2011/0000212 A1 * | 1/2011 | Wolter | F01K 27/005 |
| | | | 60/645 |
| 2011/0120126 A1 | 5/2011 | Srinivasan | |
| 2012/0091942 A1 | 4/2012 | Jones et al. | |
| 2012/0240576 A1 | 9/2012 | Johnson | |
| 2013/0042613 A1 | 2/2013 | Ross et al. | |
| 2013/0098035 A1 * | 4/2013 | McAlister | F03G 6/00 |
| | | | 60/641.7 |

FOREIGN PATENT DOCUMENTS

| | | |
|---|---|---|
| CN | 204267241 | 4/2015 |
| CN | 104595137 | 5/2015 |

* cited by examiner

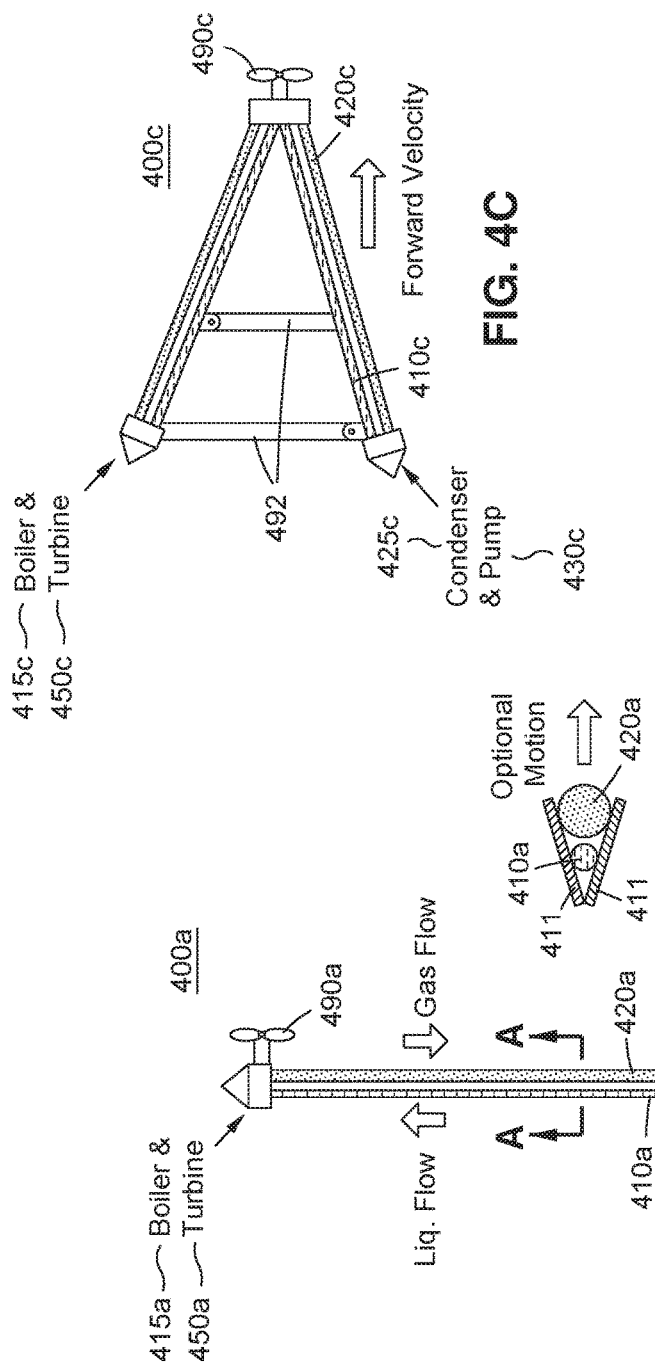
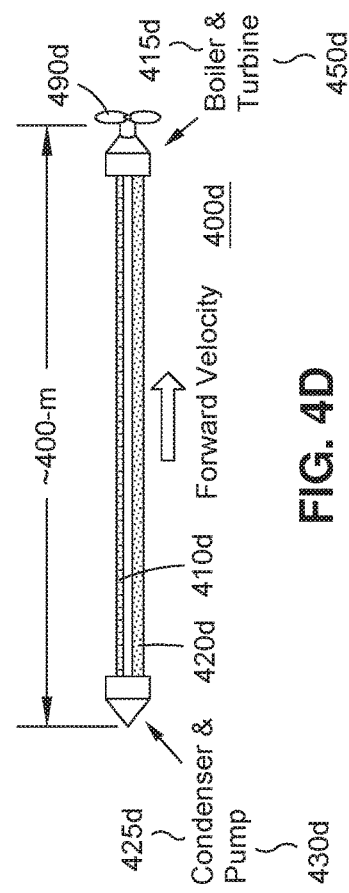
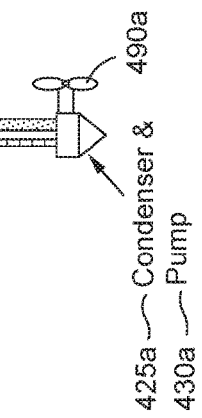

ENVIRONMENTAL THERMAL ENERGY CONVERSION

CROSS-REFERENCE TO RELATED APPLICATIONS

This application relates to and claims the benefit of U.S. Provisional Applications No. 62/415,839, filed Nov. 1, 2016 and entitled "DEEP SEA THERMAL POWER CYCLE," and No. 62/479,667, filed Mar. 31, 2017 and entitled "THERMAL ENERGY GENERATION IN POLAR REGIONS," the entire disclosures of both of which are hereby wholly incorporated by reference.

STATEMENT RE: FEDERALLY SPONSORED RESEARCH/DEVELOPMENT

Not Applicable

BACKGROUND

1. Technical Field

The present disclosure relates generally to remote ocean power generation, and more specifically to thermal energy conversion systems such as ocean thermal energy conversion (OTEC) systems.

2. Description of the Related Art

Remote ocean power is becoming increasingly important for commercial, scientific, and defense objectives. At present, most Unmanned/Autonomous Underwater Vehicles (UUVs or AUVs) and remote ocean power stations are battery powered and have limited lifetimes. This greatly limits the amount of power that can be generated and also the distance that AUVs can travel.

Most Ocean Thermal Energy Conversion (OTEC) systems use heat from the ocean to boil a volatile refrigerant at high pressure. The resulting high pressure steam generates power when it passes through a turbine, and the exiting partially condensed steam is fully condensed by cool air or cold water. Conventional OTEC systems bring huge quantities of cold ocean water to the surface from deep depths in order to perform the cooling. This is not practical for small-scale power generation (e.g. under a few kilowatts of power) due to the mechanical and thermal losses associated with pumping cold water over a large vertical extent.

In U.S. Pat. No. 7,987,674, the entire disclosure of which is incorporated herein by reference, a system is described in which a Phase Change Material (PCM) is melted (expanded) at warm temperatures, for example 15 degrees Celsius, and frozen (contracted) at cooler temperatures, for example 10 degrees Celsius. Tubes containing the PCM, which could be a paraffin such as pentadecane, are inserted into a container filled with hydraulic oil. When the PCM is melted (expanded), it pushes the oil out into a container that is pressurized to about 3000 psi. When a valve is opened, the high pressure oil passes through a hydraulic motor, which turns a generator and charges a battery. The low pressure oil is finally reabsorbed into the PCM canister when the PCM tubes are frozen (contracted). Some of the electricity produced may be used to control an external bladder or a motor to the tether line, such that depth cycling is continued for a very long period of time. Alternatively, the low pressure oil exiting from the hydraulic motor may be vented directly to an external bladder on the AUV, such that filling of the bladder causes the AUV to rise, and emptying of the bladder allows the AUV to descend. This is much more energy efficient in that the inefficiencies of converting thermal energy to electrical energy to mechanical energy is avoided.

This system has been fabricated, tested, and patented in U.S. Pat. Nos. 7,987,674 and 8,117,843, the entire disclosure of which is incorporated herein by reference, but it requires a significant amount of equipment that displaces large amounts of seawater (typically over 100 kg, although neutrally buoyant), while supplying under 0.5 watts of average power. See, for example, Chao, Yi, "Thermal Recharging Battery for Underwater Instrumentations," 2013 OBS Workshop, the entire disclosure of which is incorporated herein by reference.

Remote ocean charging stations and AUVs have also been developed that use electricity produced by waves on floating buoys and that use electricity from solar photovoltaics on floating buoys. However, exposed parts of such buoys are susceptible to storm damage, inadvertent ocean vessel collisions, and enemy detection or sabotage.

Remote power in polar regions has been proposed by using wind, waves, or solar energy. All of these systems, however, are challenging to operate in harsh high-latitude weather conditions.

Accordingly, there is a need in the art for systems and methods of remote ocean power generation that overcome the above drawbacks accompanying the related art. Various aspects of the present disclosure address these particular needs, as will be discussed in more detail below.

BRIEF SUMMARY

In accordance with one or more aspects of the present disclosure, there is provided a method of electricity production using water thermal energy by a stationary or mobile apparatus such as an unmanned research station or autonomous vehicle. A temperature difference between two depths in the ocean, or between cold air and warmer ocean water, is used to produce electricity by boiling and condensing a working fluid according to the Rankine cycle. The electricity is stored in a battery, which may be used to power a pump that drives the working fluid. If a temperature difference between two ocean water depths is used, the apparatus may be fully submerged by connection to a subsurface buoy or an AUV so as not to be seen from above and to avoid damage by storms and ocean-going vessels. If a temperature difference between air and water is used, e.g. in a polar region, the apparatus may be attached to a float, barge, or ice.

One aspect of the embodiments of the present disclosure is a method of electricity production using water thermal energy. The method includes compressing an enclosed working fluid at a first depth of a body of water to cause the enclosed working fluid to ascend to a second depth of the body of water and subsequently descend to the first depth in a closed loop. The water at the second depth has a greater temperature than the water at the first depth such that the enclosed working fluid transitions between a liquid phase at the first depth and a vapor phase at the second depth. The compressing uses power from a battery. The method further includes expanding the enclosed working fluid at the second depth to generate electricity to charge the battery.

The method may include housing the closed loop in an apparatus that is entirely submerged in the body of water, the apparatus including a subsurface float and an anchor disposed at the bottom of the body of water.

The method may include housing the closed loop in an apparatus including a surface float disposed at the surface of the body of water. The apparatus may include an anchor disposed at the bottom of the body of water.

The method may include housing the closed loop in a neutral buoyancy apparatus that is entirely submerged in the body of water.

The method may include housing the closed loop in an apparatus including an ascending liquid tube in which the enclosed working fluid ascends from the first depth to the second depth and a descending vapor tube in which the enclosed working fluid descends from the second depth to the first depth. The ascending liquid tube and the descending vapor tube may be durable enough to avoid buckling or crimping due to pressure of the body of water at the first depth and/or varying currents in the body of water between the first and second depths. The ascending liquid tube and the descending vapor tube may be capable of flexing to relieve stresses due to varying currents in the body of water between the first and second depths. The method may include controlling an amount or height of working fluid in the ascending liquid tube and/or the descending vapor tube using a working fluid reservoir included in the apparatus.

The method may include propelling an apparatus that houses the closed loop through the body of water using power from the battery. The apparatus may operable to transition from a stationary configuration to a mobile configuration in which drag is reduced relative to the stationary configuration as the apparatus is propelled through the body of water.

The method may include intermittently using generated power to charge an external battery installed in an AUV, research platform, or other power-utilizing device.

The method may include housing the closed loop in an apparatus operable to coil, collapse, or fold for easier transportation to a deployment site or for easier motion through the water.

Another aspect of the embodiments of the present disclosure is a method of electricity production using water thermal energy in a polar region of the earth. The method may include compressing an enclosed working fluid at a first height of an atmosphere above a body of water to cause the enclosed working fluid to descend to a first depth of the body of water and subsequently ascend to the first height in a closed loop. The water at the first depth has a greater temperature than the atmosphere at the first height such that the enclosed working fluid transitions between a liquid phase at the first height and a vapor phase at the first depth. The compressing uses power from a battery. The method further includes expanding the enclosed working fluid at the first depth to generate electricity to charge the battery.

The method may include cooling the enclosed working fluid at the first height by forced convection.

The method may include heating the enclosed working fluid at the first depth by forced convection.

The method may include intermittently charging an AUV or other off-shore power device using power from the battery.

In the method, heat for the expanding may come from thermal energy inside the earth, from nuclear energy, or from another type of heat source. The method may include pumping water up from a second depth of the body of water to the first depth, the water at the second depth having a greater temperature than the water at the first depth.

The method may include housing the closed loop in an apparatus including a descending liquid tube in which the enclosed working fluid descends from the first height to the first depth and an ascending vapor tube in which the enclosed working fluid ascends from the first depth to the first height. The method may include controlling an amount or height of working fluid in the descending liquid tube and/or the ascending vapor tube using a working fluid reservoir included in the apparatus.

Another aspect of the embodiments of the present disclosure is a method of electricity production using water thermal energy. The method includes compressing an enclosed working fluid at a first vertical position relative to a surface of a body of water to cause the enclosed working fluid to move to a second vertical position relative to the surface of the body of water and subsequently move to the first vertical position in a closed loop. An external environment at the second vertical position has a greater temperature than an external environment at the first vertical position such that the enclosed working fluid transitions between a liquid phase at the first vertical position and a vapor phase at the second vertical position. The compressing uses power from a battery. The method further includes expanding the enclosed working fluid at the second vertical position to generate electricity to charge the battery.

The present disclosure will be best understood by reference to the following detailed description when read in conjunction with the accompanying drawings.

BRIEF DESCRIPTION OF THE DRAWINGS

These and other features and advantages of the various embodiments disclosed herein will be better understood with respect to the following description and drawings, in which:

FIG. 4A shows an exemplary embodiment of a mobile, neutral buoyancy apparatus for use with disclosed systems and methods of electricity production using water thermal energy;

FIG. 4B shows a schematic cross section view of the apparatus of FIG. 4A taken along line A-A of FIG. 4A;

FIG. 4C shows another exemplary embodiment of a mobile, neutral buoyancy apparatus for use with disclosed systems and methods of electricity production using water thermal energy;

FIG. 4D shows another exemplary embodiment of a mobile, neutral buoyancy apparatus for use with disclosed systems and methods of electricity production using water thermal energy;

Common reference numerals are used throughout the drawings and the detailed description to indicate the same elements.

DETAILED DESCRIPTION

The detailed description set forth below in connection with the appended drawings is intended as a description of certain embodiments of systems and methods of electricity production using water thermal energy. The described embodiments are not intended to represent the only forms that may be developed or utilized. The description sets forth the various structure and/or functions in connection with the illustrated embodiments, but it is to be understood, however, that the same or equivalent structure and/or functions may be accomplished by different embodiments that are also intended to be encompassed within the scope of the present disclosure. It is further understood that the use of relational terms such as first and second, and the like are used solely to distinguish one entity from another without necessarily requiring or implying any actual such relationship or order between such entities.

Figure 1:
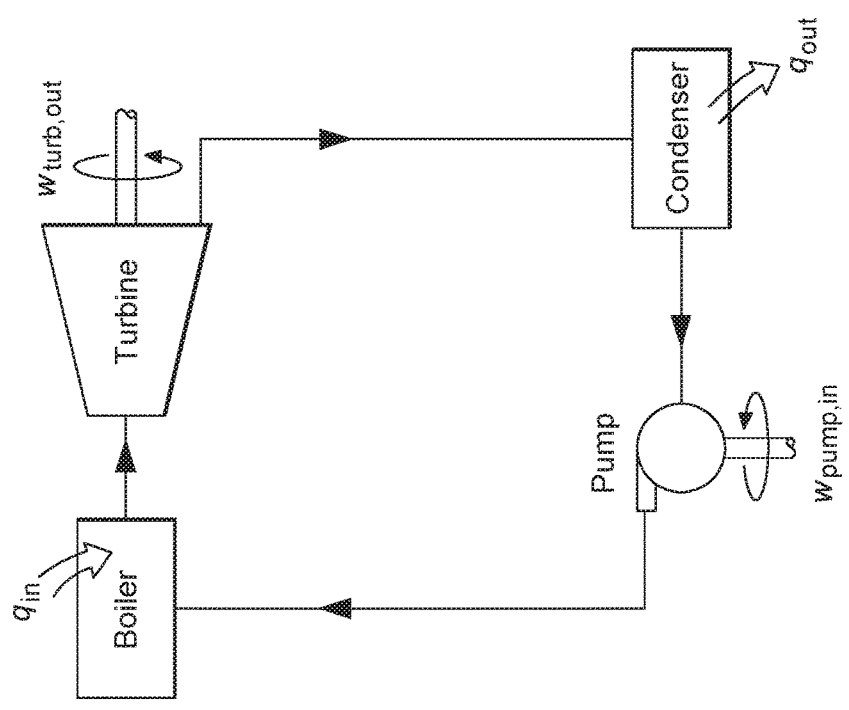
FIG. 1 is a schematic depiction of a classic Rankine power cycle.

Various aspects of the present disclosure make use of a classic Rankine power cycle, as used in many steam power generators, as well as in most existing Ocean Thermal Energy Conversion (OTEC) systems. According to the Rankine cycle, as shown in FIG. 1, heat $q_{in}$ (e.g. from burning a fossil fuel or from the ocean) is used to boil a refrigerant (e.g. water) at high pressure in a boiler. The resulting high-pressure vapor (e.g. steam) generates power as it expands through a turbine, and the exiting partially condensed vapor is fully condensed in a condenser (e.g. by cool air or cold water), rejecting heat $q_{out}$. The saturated liquid refrigerant leaving the condenser is then pumped to the boiler to begin the cycle again.

Conventional OTEC systems using the Rankine cycle bring huge quantities of cold ocean water to the surface from deep depths in order to cool and condense the refrigerant. This is not practical for very low power generation (e.g. less than one kilowatt), since the thermal leak to the cold water is too large unless much more pumping power is expended than the amount of power being generated. Unlike such conventional OTEC systems, disclosed methods described herein involve moving the refrigerant itself to deep depths (or to a cold atmosphere above the surface in polar regions) to allow cooling and condensing for an efficient low power system. The power generated may charge a battery, and the same battery may be used to power a liquid pump that drives the cycle. The battery may additionally be used for other purposes, including powering an AUV.

Figure 2:
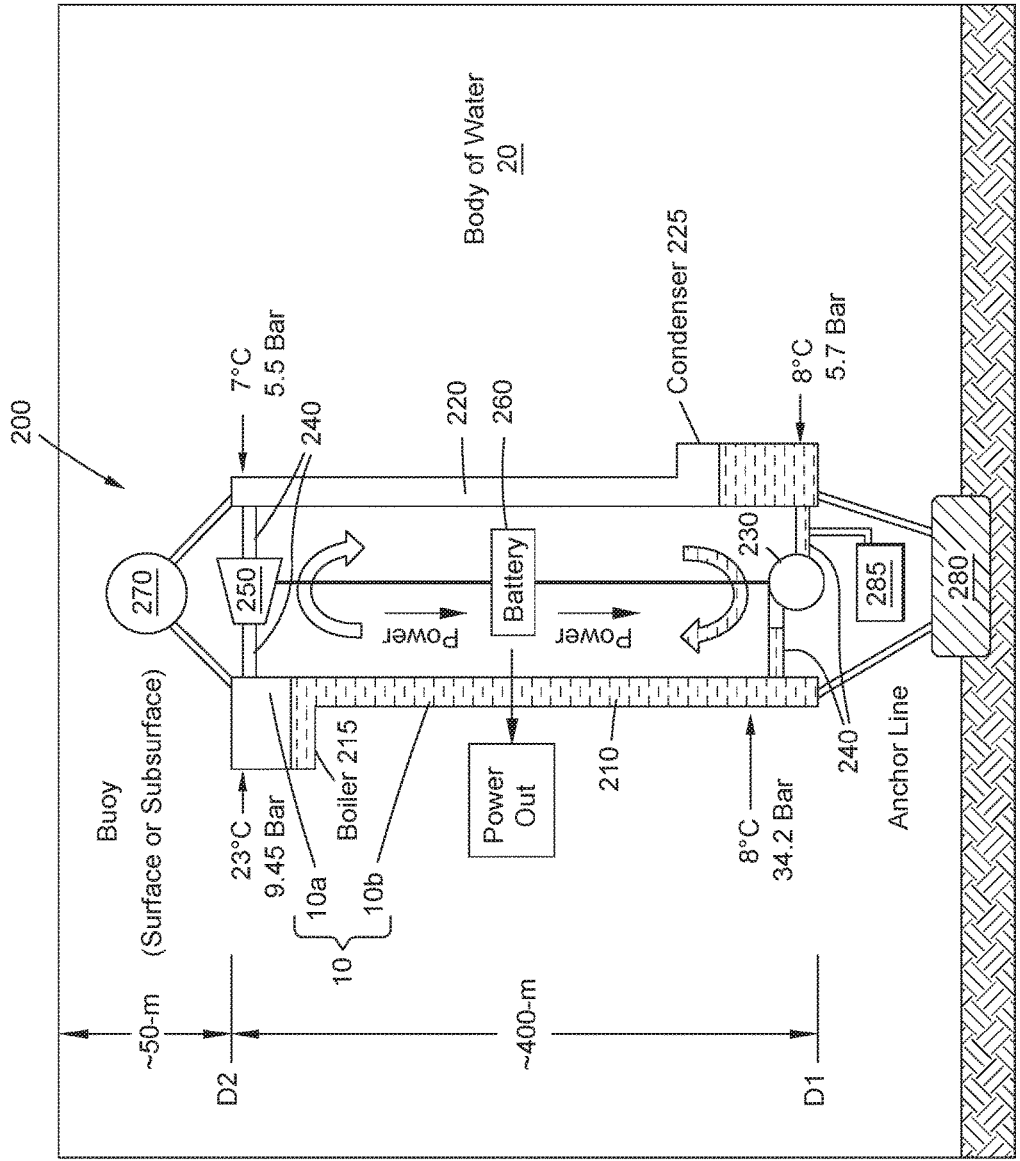
FIG. 2 shows an exemplary embodiment of an apparatus for use with disclosed systems and methods of electricity production using water thermal energy.

FIG. 2 depicts an exemplary embodiment of an apparatus 200 for use with disclosed systems and methods of electricity production using water thermal energy. The apparatus 200 includes an ascending liquid tube 210 in which an enclosed working fluid 10 ascends from a first depth D1 of a body of water 20 to a second depth D2 by operation of a liquid pump 230 of the apparatus 200 and a descending vapor tube 220 in which the enclosed working fluid 10 descends from the second depth D2 to the first depth D1 by operation of the liquid pump 230. The pump 230 compresses the enclosed working fluid 10 at the first depth D1 to cause the enclosed working fluid 10 to ascend to the second depth D2 and subsequently descend to the first depth D1 in a closed loop as shown schematically by curved arrows in FIG. 2. The liquid pump 230 may be disposed between the ascending liquid tube 210 and the descending vapor tube 220 at or near the respective lower extents thereof. A condenser 225 may be provided at the lower extent of the descending vapor tube 220 in fluid connection therewith. A connection tube 240 may fluidly connect the condenser 225 to an inlet of the pump 230, and another connection tube 240 may fluidly connect an outlet of the pump 230 to the ascending liquid tube 210.

The apparatus 200 shown in FIG. 2 further includes a turbine 250 disposed between the ascending liquid tube 210 and the descending vapor tube 220 at or near the respective upper extents thereof. A boiler 215 may be provided at the upper extent of the ascending liquid tube 210 in fluid connection therewith. A connection tube 240 may fluidly connect the boiler 215 to an inlet of the turbine 250, and another connection tube 240 may fluidly connect an outlet of the turbine 250 to the descending vapor tube 220. In this way, the ascending liquid tube 210, boiler 215, descending vapor tube 220, condenser 225, pump 230, turbine 250, and connection tubes 240 may form the closed loop in which the enclosed working fluid 10 flows by operation of the pump 230.

When the apparatus 200 is disposed vertically in the body of water 20 as shown in FIG. 2, the water at the second depth D2 may have a greater temperature than the water at the first depth D1 (e.g. due to warming of the surface of the body of water 20 by sunlight). As a result, the enclosed working fluid 10 may transition between a liquid phase 10a at the first depth D1 and a vapor phase 10b at the second depth D2. The transition from the liquid phase 10a to the vapor phase 10b may be assisted by the boiler 215, which may be structured according to known principles (e.g. as a series of tubes) to promote heat transfer between the enclosed working fluid 10 and the body of water 20 at the second depth D2. Similarly, the transition from the vapor phase 10b to the liquid phase 10a may be assisted by the condenser 225, which may be structured according to known principles (e.g. as a series of tubes) to promote heat transfer between the enclosed working fluid 10 and the body of water 20 at the first depth D1. At the inlet of the turbine 250, the enclosed working fluid 10 may be a saturated vapor, which then expands through the turbine 250, generating electricity (e.g. by turning a turbine shaft) to charge a battery 260, which, in turn powers the pump 230. The battery 260 may further power other devices as schematically shown in FIG. 2. Because the battery 260 powers the pump 230, it is not necessary to use an external or fuel-dependent power source (e.g. land power, diesel generator) to power the apparatus 200 as may be typical in conventional large scale "power plant" implementations of the Rankine power cycle. As a result, the apparatus 200 may be entirely self-sufficient, lending to long term submersion and fully mobile AUV embodiments as described in more detail below.

The ascending liquid tube 210 and the descending vapor tube 220 may be made of any material suitable for enclosing a pressurized working fluid. Preferably, the ascending tube 210 and the descending vapor tube 220 are durable enough to avoid buckling or crimping due to pressure of the body of water 20 at the first depth D1 and/or varying currents in the body of water 20 between the first and second depths D1, D2. Alternatively, or additionally, the tubes 210, 220 may be capable of flexing to relieve stresses due to the varying currents in the body of water 20. In this regard, the tubes 210, 220 may include bellows, joints, or other flexible components along their length.

The apparatus 200 of FIG. 2 further includes a buoy 270 and an anchor 280. The buoy 270 may be a subsurface float, in which case the apparatus 200 may be entirely submerged in the body of water 20 with the anchor 280 disposed at the bottom of the body of water 20, e.g. on the ocean floor. Alternatively, the buoy 270 may be a surface float disposed at the surface of the body of water 20, in which case the anchor 280 may be disposed at the bottom of the body of water 20 or may serve to orient the apparatus 200 vertically without touching the bottom of the body of water 20. Fully submerged, neutral buoyancy arrangements are also contemplated, e.g. where the buoy 270 is a subsurface float and the anchor 280 does not touch the bottom of the body of water 20, as described in more detail below. The anchor 280 may be attached by an anchor line to any part of the apparatus 200, such as one or more of the ascending liquid tube 210, descending vapor tube 220, and pump 230 at the bottom of the apparatus 200 as it is oriented in FIG. 2. For example, the anchor 280 may be attached to the ascending liquid tube 210 and descending vapor tube 220 as shown or may be attached only to the pump 230. The buoy 270 may likewise be attached by a buoy line to any part of the apparatus 200, such as one or more of the ascending liquid tube 210, descending vapor tube 220, and turbine 250 at the top of the apparatus 200 as it is oriented in FIG. 2. For example, the buoy 270 may be attached to the ascending liquid tube 210 and the descending vapor tube 220 as shown or may be attached only to the turbine 250. In order to properly orient the apparatus 200, the attachment point of the buoy 270 is preferably closer to the top of the apparatus 200 than the attachment point of the anchor 280, but other arrangements are possible.

In the case of a stationary apparatus 200 as depicted in FIG. 2, the powering of other devices by the battery 260 may include local devices such as research equipment, communication equipment, or maintenance equipment associated with the apparatus 200. As another example, the powering of other devices by the battery 260 may include an off-shore power device such as a mobile device (e.g. an AUV) that temporarily docks with the apparatus 200. In this way, the apparatus 200 may serve as a charging station for an off-shore power device, and the generated power stored in the battery 260 (or the turbine 250 output directly) may be used to intermittently charge an external battery installed in an AUV, research platform, or other power-utilizing device.

The apparatus 200 may further include a working fluid reservoir 285 by which the amount or height of working fluid 10 in the ascending liquid tube 210 and/or the descending vapor tube 220 may be controlled. The working fluid reservoir 285 may be connected to the closed loop in which the working fluid 10 flows, for example, via a valve at a connection tube 240 prior to the pump 230. The valve may be controlled manually (e.g. by maintenance personnel) or automatically by an onboard control device (e.g. a processor and memory or a programmable or dedicated circuit) according to predefined rules. Such onboard control device may be powered by the battery 260.

Exemplary pressures and temperatures are indicated in FIG. 2 for the case of ammonia ($NH_3$) as the enclosed working fluid 10. Ammonia is a common working non-CFC fluid. In the specific example represented by the numeric values in FIG. 2, the pump 230 raises the liquid pressure from 5.7 bar to 34.2 bar, to account for the 400 meter difference between depth D1 and D2. As it expands through the turbine 250, the enclosed working fluid 10 transitions from 9.45 bar at 23 degrees Celsius exiting the boiler 215 to 5.5 bar at 7 degrees Celsius exiting the turbine 250. Using a one-half inch diameter ascending liquid tube 210 and a one inch diameter descending vapor tube 220, $NH_3$ flow may be approximately 0.0088 kg/sec, with ideal turbine power output equal to approximately 542 watts and ideal pump input power requirement equal to approximately 62.3 watts. This results in a ratio of power output to power input of approximately 8.7, which may amount to an effective ratio as high as 4.0 considering real world inefficiencies. It is expected that such a system could generate a continuous 400 watts of power for 100 watts power in, thus generating 300 watts continuous net power. The turbine 250 and pump 230 have a displaced water volume mass of about 1-2 kg each. Total displaced mass is about 200 kg (including buoy 270, anchor 280, boiler 215, condenser 225, etc.), which is about two times more than a previous PCM type SOLO-TREC design (Chao, Yi, "Thermal Recharging Battery for Underwater Instrumentations," 2013 OBS Workshop), and about 1000 times more power can be produced, possibly more. In the specific example described, about 10 kW of ocean thermal heat is required to boil the ammonia in the boiler 215, and about 10 kW of heat is required to be rejected to the ocean in the condenser 225.

Other refrigerants and combinations are also possible. For example, in a case where $CO_2$ is used as the enclosed working fluid 10 instead of ammonia, the pump 230 may raise the liquid pressure from 43 bar to 95 bar to account for the 400 meter difference between depth D1 and D2 considering the weight of liquid $CO_2$. As it expands through the turbine 250, the enclosed working fluid 10 may transition from 61.4 bar at 23 degrees Celsius exiting the boiler 215 to 38 bar at 3.1 degrees Celsius exiting the turbine 250. Using a one-half inch diameter ascending liquid tube 210 and a one inch diameter descending vapor tube 220, $CO_2$ flow may be approximately 0.0088 kg/sec, with ideal turbine power output equal to approximately 120 watts and ideal pump input power requirement equal to approximately 50 watts. This results in a ratio of power output to power input of approximately 2.4. Except for small systems (e.g. under a few kilowatts of power generation), this type of OTEC system may actually be more expensive than conventional OTEC systems due to the extra power required for this increased pumping. If real world inefficiencies are considered, such a system may not actually produce a net positive energy. Additional refrigerants that could be used as the working fluid 10 may include CFCs (R-11, R-12, etc.), HCFCs (R-22, R123, etc.), HFCs (R134a, R245fa, etc.), HCs (butane, pentane, propane, etc.), FCs (fluorocarbons), and any other low freezing point fluids that have acceptable pressures.

Figure 3:
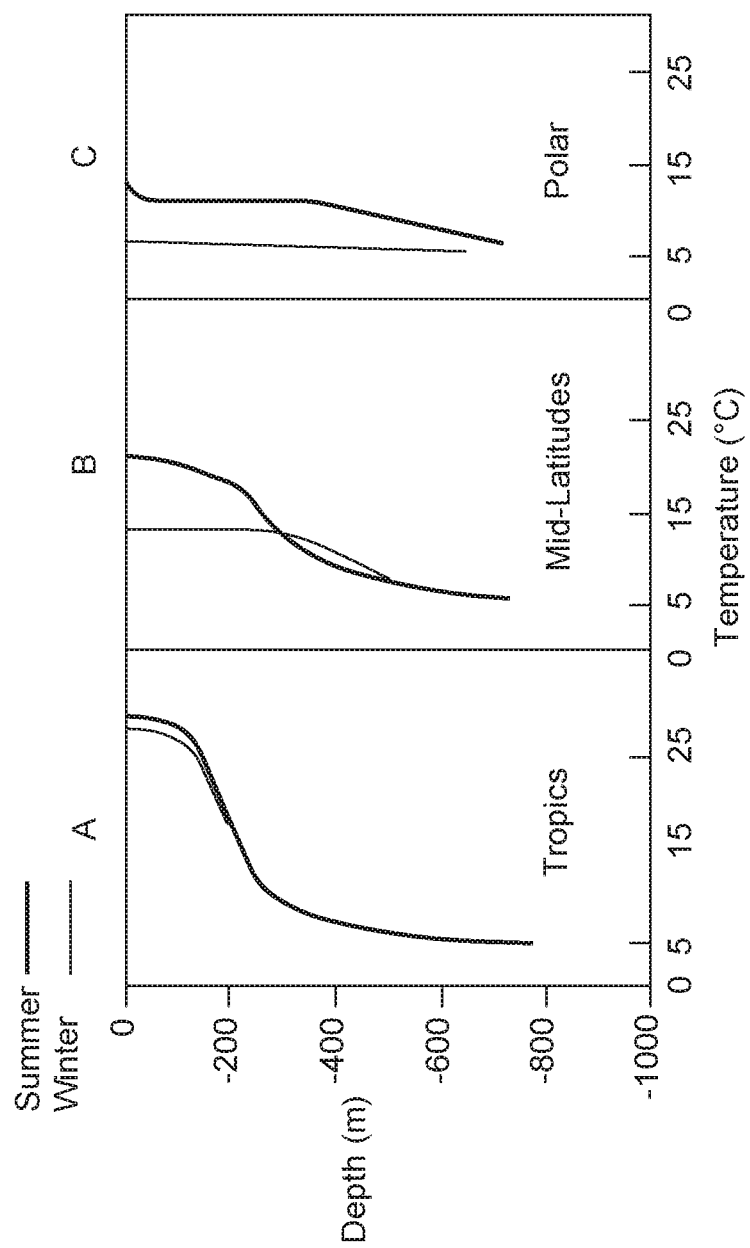
FIG. 3 shows a relationship between ocean temperature and depth in tropical, mid-latitude, and polar regions.

FIG. 3 shows a relationship between ocean temperature and depth in tropical, mid-latitude, and polar regions. Such empirical data may be used to determine the most efficient placement and vertical length of the apparatus 200. As shown, a relatively large temperature difference can be seen between around 50 meters and 450 meters below sea level in tropical and mid-latitude regions (especially in summer for mid-latitude regions). Therefore, by disposing the apparatus 200 with the condenser 225 and pump 230 at a first depth D1 of around 450 meters and the boiler 215 and turbine 250 at a second depth D2 of around 50 meters, a highly efficient use of the ocean temperature gradient can be realized, at least in tropical and mid-latitude regions. By deploying the upper end (boiler 215 and turbine 250) of the apparatus 200 below the surface (e.g. 50 meters below) as shown in FIG. 2, storm damage, inadvertent ocean vessel collisions, and enemy detection or sabotage can be avoided.

FIGS. 4A-D depict exemplary embodiments of a mobile, neutral buoyancy apparatus 400a, 400c, 400d for use with disclosed systems and methods of electricity production using water thermal energy. The example of the apparatus 400a, 400c, 400d shown in FIGS. 4A-4D may be substantially the same as that of the apparatus 200 of FIG. 2 and may include, for example, an ascending liquid tube 410a, 410c, 410d, boiler 415a, 415c, 415d, descending vapor tube 420a, 420c, 420d, condenser 425a, 425c, 425d, pump 430a, 430c, 430d, connecting tubes 440a, 440c, 440d, turbine 450a, 450c, 450d, battery 460a, 460c, 460d, buoy 470a, 470c, 470d, anchor 480a, 480c, 480d, and working fluid reservoir 485a, 485c, 485d corresponding to and substantially the same as the ascending liquid tube 210, boiler 215, descending vapor tube 220, condenser 225, pump 230, connecting tubes 240, turbine 250, battery 260, buoy 270, anchor 280, and working fluid reservoir 285 of the apparatus 200. However, FIGS. 4A-D further illustrate features that may be associated with mobile embodiments rather than the stationary embodiment of FIG. 2. In this regard, the buoy 470a, 470c, 470d and/or anchor 480a, 480c, 480d may or may not be included, as neutral buoyancy of the apparatus 400a, 400c, 400d may be achieved, for example, by appropriate selection of the enclosed working fluid 10 and other design materials, with the apparatus 400a, 400c, 400d deployed extending vertically from about 50 meters to about 450 meters as in FIG. 2.

The apparatus 400a, 400c, 400d may further include one or more propellers 490a, 490c, 490d for mobility, which can be powered by the same battery that is charged by the turbine (e.g. the battery 460a, 460c, 460d, not pictured in FIGS. 4A-4D). By means of the one or more propellers 490a, 490c, 490d, the apparatus 400a, 400c, 400d may have movement capabilities including forward thrust, backward thrust, turning, and/or depth adjustment. Depending on the desired mobility of the apparatus 400a, 400c, 400d, the propellers 490a, 490c, 490d may be tiltable, rotatable, or otherwise movable on one or more axes relative to the apparatus 400a, 400c, 400d in order to orient the propeller 490a, 490c, 490d for thrust in a range of directions. Such orientation may also be powered by the same battery that is charged by the turbine (e.g. the battery 460a, 460c, 460d, not pictured in FIGS. 4A-4D).

As shown in FIG. 4A, the one or more propellers 490a may be disposed on the ends of the apparatus 400a, with one propeller 490a disposed at an upper end near the turbine 450a and another propeller 490a disposed at a lower end near the pump 430a. FIG. 4B shows a schematic cross section of the apparatus 400a taken along line A-A of FIG. 4A. As shown in FIG. 4B, the descending vapor tube 420a may have approximately twice the diameter of the ascending liquid tube 410a (e.g. one inch and one-half inch as described above). The propellers 490a may be positioned on the same side as the descending vapor tube 420a to propel the apparatus 400a as shown. In this way, the relative sizes of the tubes 410a, 420a may give the apparatus 400a an airfoil shape that helps to reduce drag. One or more fairings 411 may be included to further reduce drag. The fairings 411 may be, for example, elongated vertical plates as shown, extending along the length of the tubes 410a, 420a on either side and separated in the front (in the direction of motion) by the curved exterior of the larger descending vapor tube 420a. The fairings 411 may meet in the back (behind the smaller ascending liquid tube 410a) as shown.

Alternatively, a single propeller 490c may be disposed near the center of the apparatus 400c as shown in FIG. 4C, with the ascending liquid tube 410c and descending vapor tube 420c foldable by means of flexible joints at a propeller hub near the center of the apparatus 400c in the vertical direction. Folding of the ascending liquid tube 410c and descending vapor tube 420c may be done by means of one or more actuators powered by the same battery that is charged by the turbine (e.g. battery 460c, not pictured in FIG. 4C). Struts 492 may extend to support the folded tubes 410c, 420c at one or more positions along their length as shown. For example, the struts 492 may be initially aligned parallel with the tubes 410c, 420c and may be hinged to extend away from the tubes 410c, 420c to connect the two folded ends of the tubes 410c, 420c as shown. Actuation of the struts 492 between aligned and extended positions may be by means of one or more actuators powered by the same battery that is charged by the turbine (e.g. battery 460c, not pictured in FIG. 4C). In this way, the apparatus 400c is operable to transition from a stationary, unfolded configuration to a mobile, folded configuration in which drag is reduced relative to the stationary configuration as the apparatus is propelled through the body of water. A coiled, collapsed, or folded configuration such as that of FIG. 4C may also allow for easier transportation of the apparatus 400c to a deployment site.

As another alternative, a single propeller 490d may be disposed at one vertical end of the apparatus 400d as shown in FIG. 4D, e.g. at an upper end near the boiler 415d and turbine 450d as shown (or alternatively/additionally at a lower end near the condenser 425d and pump 430d). In such a configuration, the apparatus 400d may rotate itself to a horizontal position and move longitudinally with the entire apparatus 400d substantially at the same depth. Rotation of the apparatus 400d may be achieved by means of the propeller 490d, e.g. by tilting the propeller 400d on one or more axes as described above. In this way, the apparatus 400d is operable to transition from a stationary, vertical configuration to a mobile, horizontal configuration in which drag is reduced relative to the stationary configuration as the apparatus is propelled through the body of water.

Figure 5B:
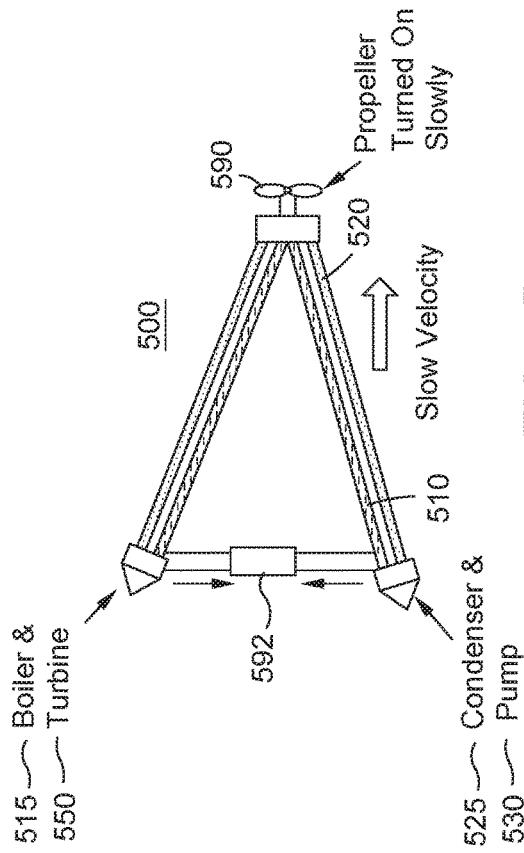
FIGS. 5A-5C show another exemplary embodiment of a mobile, neutral buoyancy apparatus for use with disclosed systems and methods of electricity production using water thermal energy, with FIG. 5A showing a stationary and vertical configuration, FIG. 5B showing a folding configuration, and FIG. 5C showing a fully horizontal and compact configuration.
Figure 5C:
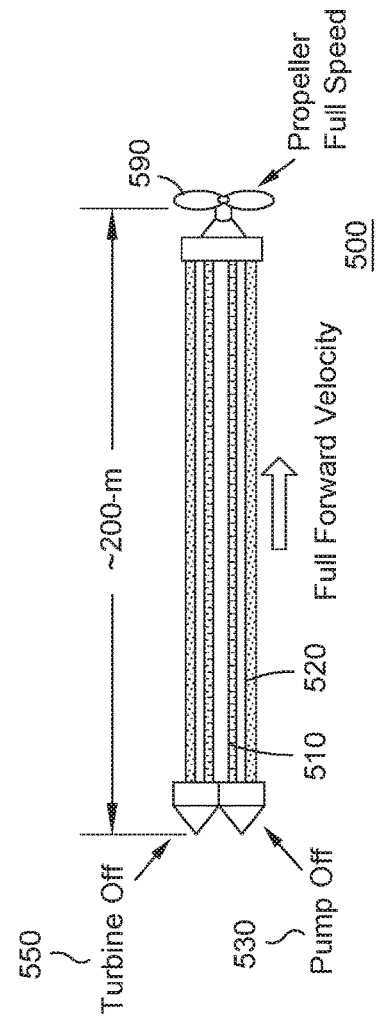
Figure 5A:
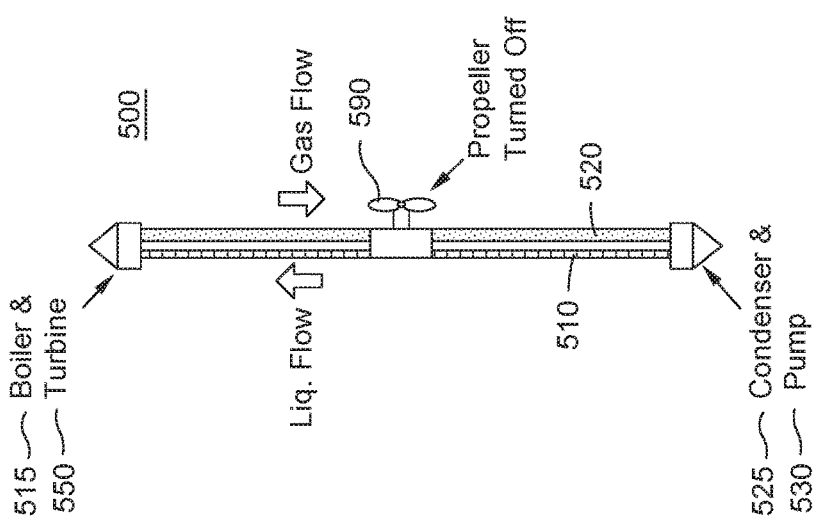

FIGS. 5A-5C depict another exemplary embodiment of a mobile, neutral buoyancy apparatus 500 for use with disclosed systems and methods of electricity production using water thermal energy. The example of the apparatus 500 shown in FIGS. 5A-5C may be substantially the same as that of the apparatus 200 of FIG. 2 and may include, for example, an ascending liquid tube 510, boiler 515, descending vapor tube 520, condenser 525, pump 530, connecting tubes 540, turbine 550, battery 560, buoy 570, anchor 580, and working fluid reservoir 585 corresponding to and substantially the same as the ascending liquid tube 210, boiler 215, descending vapor tube 220, condenser 225, pump 230, connecting tubes 240, turbine 250, battery 260, buoy 270, anchor 280, and working fluid reservoir 285 of the apparatus 200. However, FIGS. 5A-5D further illustrate features that may be associated with mobile embodiments rather than the stationary embodiment of FIG. 2. In this regard, the buoy 570 and/or anchor 580 may or may not be included, as neutral buoyancy of the apparatus 500 may be achieved, for example, by appropriate selection of the enclosed working fluid and other design materials, with the apparatus 500 deployed extending vertically from about 50 meters to about 450 meters as in FIG. 2.

The apparatus 500 may further include a propeller 590 for mobility, which can be powered by the same battery that is charged by the turbine (e.g. the battery 560, not pictured in FIGS. 5A-5C). By means of the propeller 590, the apparatus 500 may have movement capabilities including forward thrust, backward thrust, turning, and/or depth adjustment. Depending on the desired mobility of the apparatus 500, the propeller 590 may be tiltable, rotatable, or otherwise movable on one or more axes relative to the apparatus 500 in order to orient the propeller 590 for thrust in a range of directions. Such orientation may also be powered by the same battery that is charged by the turbine (e.g. the battery 560, not pictured in FIGS. 5A-5C).

As shown in FIGS. 5A-5C, the propeller 590 may be disposed near the center of the apparatus 500, similar to the propeller 490c of the apparatus 400c described above with respect to FIG. 4C. Also like the apparatus 400c, the ascending liquid tube 510 and the descending vapor tube 520 may be foldable by means of flexible joints at a propeller hub near the center of the apparatus 500 in the vertical direction. In the case of the apparatus 500, an electrically actuated winch 592 may be provided, connected to the upper end (near the boiler 515 and turbine 550) and the lower end (near the condenser 525 and pump 530) by cables. Upon being powered by the same battery that is charged by the turbine (e.g. battery 560, not pictured in FIGS. 5A-5C), the winch 592 may draw in the cables as schematically shown by the downward and upward arrows in FIG. 5B. The cables may, for example, wind on one or more spools in a housing of the winch 592. FIG. 5C shows a completely folded state of the apparatus 500, after the operation of the winch 592 is complete. As shown, the folded state of the apparatus 400 is approximately half the length of the unfolded state. When the apparatus 500 is in use, power may be generated and stored in the battery 560 (not pictured) while the unit is stationary and vertical as shown in FIG. 5A, with the pump 530 and turbine 550 operated in cold water and warm water, respectively. With the battery 560 charged, the apparatus 500 may fold as shown in FIG. 5B to a fully horizontal and compact position as shown in FIG. 5C, after which the apparatus 500 can be propelled by the propeller 590 in any desired direction (though the propeller 590 may turn on slowly as the apparatus 500 folds as shown in FIG. 5B). In this way, the apparatus 500 is operable to transition from a stationary, unfolded configuration to a mobile, folded configuration in which drag is reduced relative to the stationary configuration as the apparatus is propelled through the body of water. A coiled, collapsed, or folded configuration such as that of FIG. 4C may also allow for easier transportation of the apparatus 500 to a deployment site.

In the case of mobile apparatuses such as the apparatuses 400a, 400c, 400d, 500 described in relation to FIGS. 4A-4D and 5A-5C, the battery 460a, 460c, 460d, 560 may be used to power propellers 490a, 490c, 490d, 590 and other local devices (e.g. coiling, collapsing, or folding devices) associated with mobility as described above, in addition to the pump 430a, 430c, 430d, 530. In this way, the battery 460a, 460c, 460d, 560 may power an AUV, i.e. an AUV comprising the apparatus 400a, 400c, 400d, 500. In addition, just as in the case of the stationary apparatus 200, the battery 460a, 460c, 460d, 560 may further power other local devices such as research equipment, communication equipment, or maintenance equipment associated with the apparatus 400a, 400c, 400d, 500, as well as external off-shore power device such as a mobile device (e.g. a second AUV).

Figure 6:
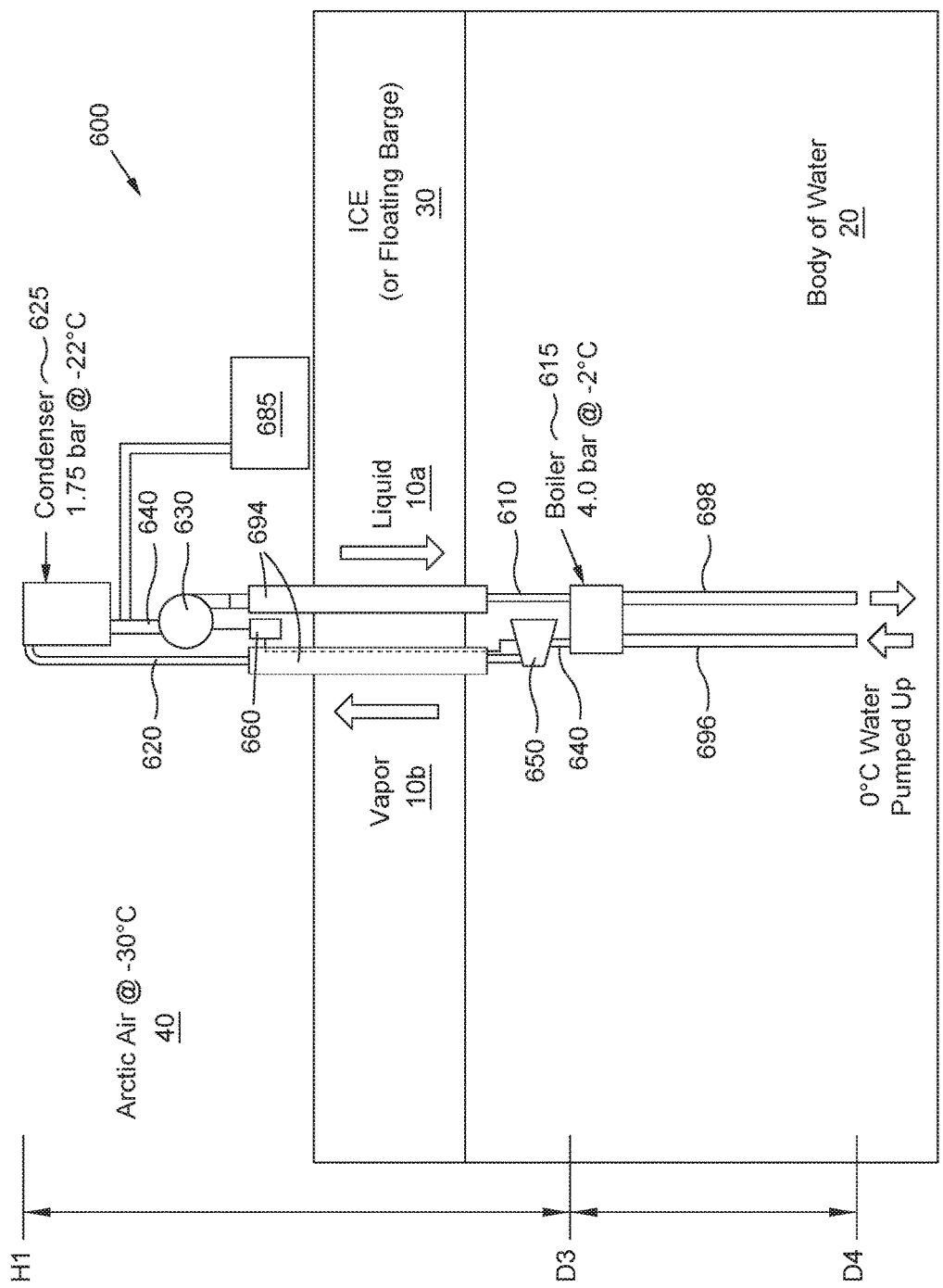
FIG. 6 shows an exemplary embodiment of an apparatus for use with disclosed systems and methods of electricity production using water thermal energy in a polar region.

FIG. 6 depicts an exemplary embodiment of an apparatus 600 for use with disclosed systems and methods of electricity production using water thermal energy in a polar region of the earth. As described above in relation to FIG. 3, tropical and mid-latitude regions of the earth may exhibit large ocean temperature gradients that may be harnessed by the Rankine cycles of the apparatuses 200, 400a, 400c, 400d, 500 disclosed herein, while polar regions exhibit smaller ocean temperature gradients. The apparatus 600 addresses this difficulty by taking advantage of the larger difference between ocean temperature and air temperature in polar regions.

The apparatus 600 includes a descending liquid tube 610 in which an enclosed working fluid 10 descends from a first height H1 of an atmosphere 40 above a body of water 20 to a first depth D3 of the body of water by operation of a liquid pump 630 of the apparatus 600 and an ascending vapor tube 620 in which the enclosed working fluid 10 ascends from the second depth D3 to the first height H1 by operation of the liquid pump 630. The pump 630 compresses the enclosed working fluid 10 to cause the enclosed working fluid 10 to descend from the first depth H1 to the first depth D3 and subsequently ascend to the first height H1 in a closed loop. The liquid pump 630 may be disposed at the top of the descending liquid tube 610 and arranged to receive the output of a condenser 625 disposed at the top of the ascending vapor tube 620 at the height H1. A connection tube 640 may fluidly connect an outlet of the condenser 625 to an inlet of the pump 630. The ascending vapor tube 620 may connect, at its upper extent, to an inlet of the condenser 625.

The apparatus 600 shown in FIG. 6 further includes a turbine 650 disposed at the bottom of the ascending vapor tube 620 and arranged to receive the output of a boiler 615 disposed at the bottom of the descending liquid tube 610 at the depth D3. A connection tube 640 may fluidly connect an outlet of the boiler 615 to an inlet of the turbine 650. The descending liquid tube 610 may connected, at its lower extent, to an inlet of the boiler 615. In this way, the descending liquid tube 610, boiler 615, ascending vapor tube 620, condenser 625, pump 630, turbine 650, and connection tubes 640 may form the closed loop in which the enclosed working fluid 10 flows by operation of the pump 630.

The apparatus 600 may be disposed vertically in ice or a floating barge 30, e.g. through one or more boreholes penetrated by sheaths 694 that support the descending liquid tube 610 and ascending vapor tube 620 as shown in FIG. 6. As is typical in polar regions, the water at the first depth D3 may have a greater temperature than the air at the first height H1 (e.g. due to the higher density of slightly warmer, saltier water). As a result, the enclosed working fluid 10 may transition between a liquid phase at the first height H1 and a vapor phase at the first depth D3. The transition from the liquid phase 10a to the vapor phase 10b may be assisted by the boiler 615, which may be structured according to known principles (e.g. as a series of tubes) to promote heat transfer between the enclosed working fluid 10 and the body of water 20 at the first depth D3. Similarly, the transition from the vapor phase 10b to the liquid phase 10a may be assisted by the condenser 625, which may be structured according to known principles (e.g. as a series of tubes) to promote heat transfer between the enclosed working fluid 10 and the atmosphere 40 at the first height H1. At the inlet of the turbine 650, the enclosed working fluid 10 may be a saturated vapor, which then expands through the turbine 650, generating electricity (e.g. by turning a turbine shaft) to charge a battery 660, which, in turn powers the pump 630. The battery 660 may further power other devices. As schematically shown in FIG. 6, the connection between the turbine 650 and the battery 660 may be made through one of the sheaths 694.

The powering of other devices by the battery 660 may include local devices such as research equipment, communication equipment, or maintenance equipment associated with the apparatus 600. As another example, the powering of other devices by the battery 660 may include an off-shore power device such as a mobile device (e.g. an AUV) that temporarily docks with the apparatus 600. In this way, the apparatus 600 may serve as a charging station for an off-shore power device, and the generated power stored in the battery 660 (or the turbine 650 output directly) may be used to intermittently charge an external battery installed in an AUV, research platform, or other power-utilizing device.

The apparatus 600 may further include a working fluid reservoir 685 by which the amount or height of working fluid 10 in the descending liquid tube 610 and/or the ascending vapor tube 620 may be controlled. The working fluid reservoir 685 may be connected to the closed loop in which the working fluid 10 flows, for example, via a valve at a connection tube 640 prior to the pump 630. The valve may be controlled manually (e.g. by maintenance personnel) or automatically by an onboard control device (e.g. a processor and memory or a programmable or dedicated circuit) according to predefined rules. Such onboard control device may be powered by the battery 660.

Exemplary pressures and temperatures are indicated in FIG. 6 for the case of ammonia ($NH_3$) as the enclosed working fluid 10. In the specific example represented by the numeric values in FIG. 6, the ammonia condenses at about 1.75 bar at negative 22 degrees Celsius (−22° C.) as the tubes are exposed to natural convection of the cold polar air in the condenser 625. The working fluid 10 may further be cooled by forced convection at the first height H1, e.g., by a fan powered by the battery 660. The use of ammonia flowing at about 0.01 kilograms per second (e.g. using a one-half inch diameter descending liquid tube 610 and a one inch diameter ascending vapor tube 620) allows an ideal turbine power of about 958 watts when the liquid ammonia is pumped up to about 4.0 bar by the pump 630 and boiled in the boiler 615 using heat from the ocean at about negative 2 degrees Celsius (−2° C.), and thereafter expanded to 1.75 bar through the turbine 650. With real turbine efficiencies and pump efficiencies, it is expected that about 660 watts of electricity can be generated using only about 10 watts of electrical pump power and many kilowatts of heat from the ocean water.

In some embodiments, forced convection (e.g. powered by the battery 660) may be employed at the boiler 615 (e.g. at boiler fins) in order to help prevent freezing of water. In this way, the enclosed working fluid may be heated at the first depth D3 by forced convection. Alternatively, or in addition, warmer (e.g. 0 degrees Celsius) ocean water from a second depth D4 below the first depth D3 may be circulated to the boiler 615 by a warm water input tube 696 and a cold water output tube 698 as shown in FIG. 6, using a secondary pump (not shown) powered by the battery 660. Alternatively, the boiling itself can be performed at some distance below the ice (e.g. at the second depth D4). In these ways, ice can be prevented from forming on the boiler 615 as heat is removed from the otherwise nearly frozen seawater just below the ice 30.

Figure 7:
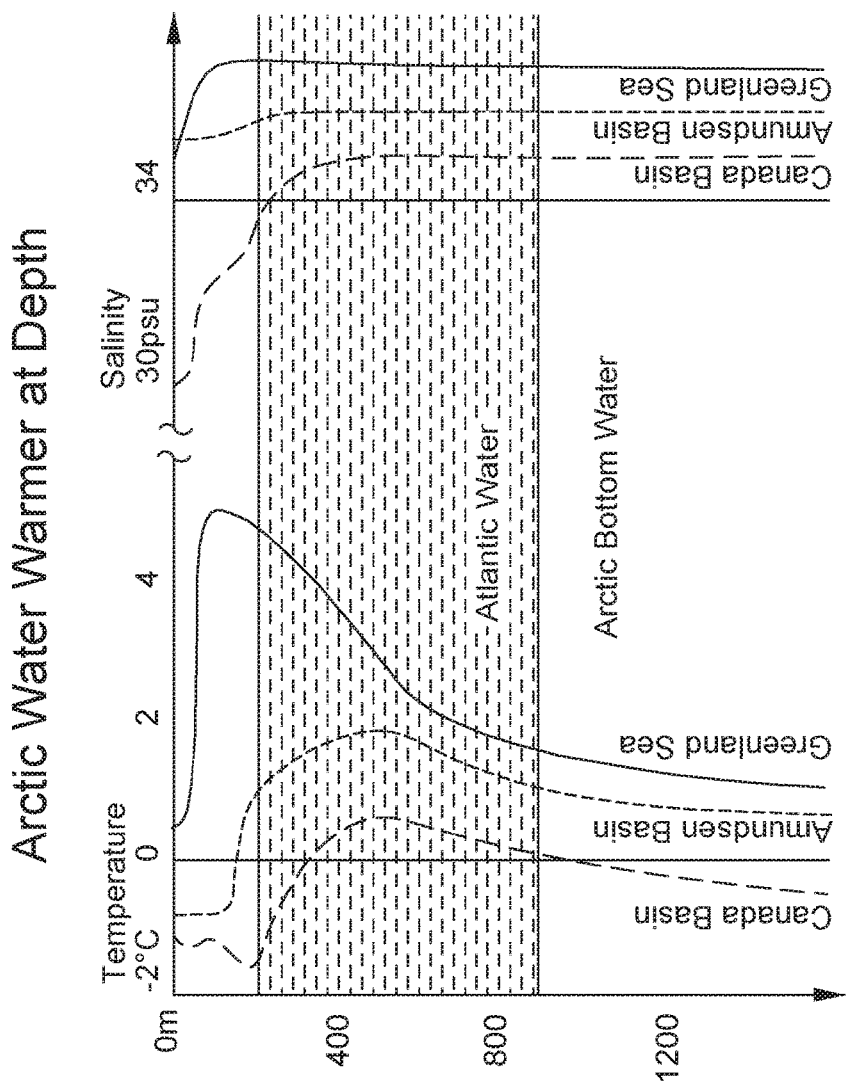
FIG. 7 shows a relationship between ocean temperature (as well as salinity) and depth in various polar regions.

FIG. 7 shows a relationship between ocean temperature (as well as salinity) and depth in various polar regions. Empirical data such as that shown in FIG. 7 can be used to determine the most efficient placement of the boiler 615 or pumping depth of a cold water input tube 696 and cold water output tube 698. As shown in FIG. 7, water at depths between around 200 meters and around 900 meters may be warmer than water near the surface in polar regions due to the presence of ice at the surface. Therefore, for example, the tubes 696, 698 may circulate water from a between around 200 and 900 meters, or alternatively the boiler 615 and turbine 650 may be disposed at a depth between around 200 and 900 meters (omitting the tubes 696, 698).

The descending liquid tube 610 and the ascending vapor tube 620 may be made of any material suitable for enclosing a pressurized working fluid. If a warm water input tube 696 and a cold water output tube 698 are additionally used, or if the descending liquid tube 610 and ascending vapor tube 620 themselves extend to a deeper second depth D4 as described above, the tubes are preferably durable enough to avoid buckling or crimping due to pressure of the body of water 20 at the second depth D4 and/or varying currents in the body of water between the second depth D4 and the first depth D3 or between the second depth D4 and the surface of the body of water 20. Alternatively, or additionally, the tubes 610, 620, 696, 698 may be capable of flexing to relieve stresses due to the varying currents in the body of water 20. In this regard, the tubes 610, 620, 696, 698 may include bellows, joints, or other flexible components along their length.

The particulars shown herein are by way of example only for purposes of illustrative discussion, and are not presented in the cause of providing what is believed to be most useful and readily understood description of the principles and conceptual aspects of the various embodiments of the present disclosure. In this regard, no attempt is made to show any more detail than is necessary for a fundamental understanding of the different features of the various embodiments, the description taken with the drawings making apparent to those skilled in the art how these may be implemented in practice.

What is claimed is:

1. A method of propelling an apparatus through a body of water using water thermal energy, the method comprising:
   pressurizing an enclosed working fluid to cause the enclosed working fluid to ascend from a first depth to a second depth of a body of water and subsequently descend to the first depth in a closed loop, the water at the second depth having a greater temperature than the water at the first depth such that the enclosed working fluid transitions to a liquid phase in a condenser portion of the closed loop at the first depth and to a vapor phase in a boiler portion of the closed loop at the second depth, the pressurizing done by a pump using power from a battery;
   expanding the enclosed working fluid through a turbine at the second depth to generate electricity to charge the battery;
   transitioning an apparatus that houses the closed loop, the pump, and the turbine from a stationary configuration in which a vertical extent of the closed loop extends at least from the first depth to the second depth to a mobile configuration in which the vertical extent of the closed loop is reduced relative to the stationary configuration; and
   propelling the apparatus through the body of water using power from the battery while the apparatus is in the mobile configuration.

2. The method of claim 1, further comprising entirely submerging the apparatus in the body of water, the apparatus including a subsurface float.

3. The method of claim 1, further comprising partially submerging the apparatus in the body of water, the apparatus including a surface float disposed at the surface of the body of water.

4. The method of claim 1, further comprising entirely submerging the apparatus in the body of water, the apparatus having neutral buoyancy.

5. The method of claim 1, wherein the apparatus includes an ascending liquid tube in which the enclosed working fluid ascends from the first depth to the second depth and a descending vapor tube in which the enclosed working fluid descends from the second depth to the first depth, the ascending liquid tube and the descending vapor tube being durable enough to avoid buckling or crimping due to pressure of the body of water at the first depth and/or varying currents in the body of water between the first and second depths.

6. The method of claim 1, wherein the apparatus includes an ascending liquid tube in which the enclosed working fluid ascends from the first depth to the second depth and a descending vapor tube in which the enclosed working fluid descends from the second depth to the first depth, the ascending liquid tube and the descending vapor tube being capable of flexing to relieve stresses due to varying currents in the body of water between the first and second depths.

7. The method of claim 1 further comprising intermittently using generated power to charge an external battery installed in an AUV, research platform, or other power-utilizing device.

8. The method of claim 1, wherein the transitioning includes coiling, collapsing, or folding the apparatus.

9. The method of claim 1, wherein the apparatus includes an ascending liquid tube in which the enclosed working fluid ascends from the first depth to the second depth and a descending vapor tube in which the enclosed working fluid descends from the second depth to the first depth, the method further comprising controlling an amount or height of working fluid in the ascending liquid tube and/or the descending vapor tube using a working fluid reservoir included in the apparatus.

10. A method of electricity production using water thermal energy in a polar region of the earth, the method comprising:
pressurizing an enclosed working fluid to cause the enclosed working fluid to descend from a first height of an atmosphere above a body of water to a first depth of the body of water and subsequently ascend to the first height in a closed loop, the water at the first depth having a greater temperature than the atmosphere at the first height such that the enclosed working fluid transitions to a liquid phase in a condenser portion of the closed loop at the first height and to a vapor phase in a boiler portion of the closed loop at the first depth, the pressurizing done by a pump using power from a battery; and
expanding the enclosed working fluid through a turbine at the first depth to generate electricity to charge the battery.

11. The electricity production method of claim 10, further comprising cooling the enclosed working fluid at the first height by forced convection.

12. The electricity production method of claim 10, further comprising heating the enclosed working fluid at the first depth by forced convection.

13. The electricity production method of claim 10, further comprising intermittently charging an AUV or other offshore power device using power from the battery.

14. The electricity production method of claim 10, wherein heat for the expanding comes from thermal energy inside the earth or from nuclear energy.

15. The electricity production method of claim 10, further comprising pumping water up from a second depth of the body of water to the first depth, the water at the second depth having a greater temperature than the water at the first depth.

16. The electricity production method of claim 10, further comprising:
housing the closed loop in an apparatus including a descending liquid tube in which the enclosed working fluid descends from the first height to the first depth and an ascending vapor tube in which the enclosed working fluid ascends from the first depth to the first height; and
controlling an amount or height of working fluid in the descending liquid tube and/or the ascending vapor tube using a working fluid reservoir included in the apparatus.

17. The method of claim 8, wherein the apparatus includes an ascending liquid tube in which the enclosed working fluid ascends from the first depth to the second depth and a descending vapor tube in which the enclosed working fluid descends from the second depth to the first depth, and the transitioning includes folding the ascending liquid tube and the descending vapor tube using one or more actuators powered by the battery.

18. The method of claim 17, wherein the one or more actuators includes an electrically actuated winch connected to opposing ends of the apparatus by cables.

19. The method of claim 17, wherein the apparatus in the mobile configuration is approximately half the length of the apparatus in the stationary configuration.

20. The method of claim 1, wherein the transitioning includes reorienting the apparatus to a horizontal position in which the vertical extent of the closed loop is minimized.

21. The method of claim 1, wherein the condenser portion includes a condenser comprising a series of tubes.

22. The method of claim 1, wherein the boiler portion includes a boiler comprising a series of tubes.

23. The electricity production method of claim 10, wherein the condenser portion includes a condenser comprising a series of tubes.

24. The electricity production method of claim 10, wherein the boiler portion includes a boiler comprising a series of tubes.

* * * * *